US010287369B2

(12) United States Patent
Schwerdtfeger et al.

(10) Patent No.: US 10,287,369 B2
(45) Date of Patent: May 14, 2019

(54) METHODS OF PREPARING A CATALYST

(71) Applicant: Chevron Phillips Chemical Company LP, The Woodlands, TX (US)

(72) Inventors: Eric D. Schwerdtfeger, Bartlesville, OK (US); Max P. McDaniel, Bartlesville, OK (US); Ted H. Cymbaluk, Seabrook, TX (US); Jeremy M. Praetorius, Bartlesville, OK (US); Kathy S. Clear, Bartlesville, OK (US); Alan L. Solenberger, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 38 days.

(21) Appl. No.: 15/495,116

(22) Filed: Apr. 24, 2017

(65) Prior Publication Data

US 2018/0305473 A1 Oct. 25, 2018

(51) Int. Cl.
*C08F 4/69* (2006.01)
*C08F 110/02* (2006.01)
*C08F 10/02* (2006.01)
*B01J 37/08* (2006.01)
*B01J 37/14* (2006.01)
*B01J 23/26* (2006.01)
*B01J 35/02* (2006.01)
*B01J 35/10* (2006.01)
*C08F 2/34* (2006.01)
*C08F 4/02* (2006.01)
*C08F 4/24* (2006.01)
*C08F 4/76* (2006.01)
*C08F 4/78* (2006.01)
*B01J 37/02* (2006.01)

(52) U.S. Cl.
CPC .............. *C08F 10/02* (2013.01); *B01J 23/26* (2013.01); *B01J 35/023* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 37/08* (2013.01); *B01J 37/14* (2013.01); *C08F 2/34* (2013.01); *C08F 4/025* (2013.01); *C08F 4/24* (2013.01); *C08F 4/76* (2013.01); *C08F 4/78* (2013.01); *C08F 110/02* (2013.01); *B01J 37/0203* (2013.01); *B01J 37/0205* (2013.01); *B01J 37/086* (2013.01); *B01J 2523/00* (2013.01)

(58) Field of Classification Search
CPC ........... C08F 4/69; C08F 110/02; C08F 10/02
See application file for complete search history.

(56) References Cited

U.S. PATENT DOCUMENTS

| | | | |
|---|---|---|---|
| 2,503,913 | A | 4/1950 | Kimberlin, Jr. et al. |
| 3,119,569 | A | 1/1964 | Baricordi |
| 3,248,179 | A | 4/1966 | Norwood |
| 3,622,521 | A | 11/1971 | Hogan et al. |
| 3,780,011 | A | 12/1973 | Pullukat et al. |
| 3,875,079 | A | 4/1975 | Witt |
| 3,882,096 | A | 5/1975 | Shida et al. |
| 3,887,494 | A | 6/1975 | Dietz |
| 3,900,457 | A | 8/1975 | Witt |
| 3,970,613 | A | 7/1976 | Goldie et al. |
| 3,976,632 | A | 8/1976 | Delap |
| 4,041,224 | A | 8/1977 | Hoff et al. |
| 4,053,436 | A | 10/1977 | Hogen et al. |
| 4,119,569 | A | 10/1978 | Dietz |
| 4,169,926 | A | 10/1979 | McDaniel |
| 4,190,457 | A | 2/1980 | McDaniel |
| 4,218,345 | A | 8/1980 | Hoff et al. |
| 4,247,421 | A | 1/1981 | McDaniel et al. |
| 4,280,141 | A | 7/1981 | McCann et al. |
| 4,294,724 | A | 10/1981 | McDaniel |
| 4,296,001 | A | 10/1981 | Hawley |
| 4,299,731 | A | 11/1981 | McDaniel et al. |
| 4,312,967 | A | 1/1982 | Norwood et al. |
| 4,345,055 | A | 8/1982 | Hawley |

(Continued)

FOREIGN PATENT DOCUMENTS

| | | |
|---|---|---|
| EP | 0033953 A2 | 8/1981 |
| EP | 0085857 B1 | 8/1983 |

(Continued)

OTHER PUBLICATIONS

Filing receipt and specification for patent application entitled "Methods of Preparing a Catalyst Utilizing Hydrated Reagents," by Max McDaniel, et al., filed Nov. 17, 2017 as U.S. Appl. No. 15/816,131.

(Continued)

*Primary Examiner* — Caixia Lu
(74) *Attorney, Agent, or Firm* — Conley Rose, P.C.

(57) ABSTRACT

A method comprising calcining a catalyst precursor comprising chromium and a silica support material at a temperature in the range of from about 95° C. to about 400° C. in a bed fluidized by a gas flowing at a volumetric flow rate of from about 2.5 to about 30 times the settled volume of the bed per minute to form a calcined catalyst precursor. A method comprising calcining a catalyst precursor comprising chromium and silica at a temperature in the range of from about 95° C. to about 400° C. with a gas flowing through the bed at a gas hourly space velocity of from about 15 to about 200 per hour. A method comprising calcining a catalyst precursor comprising chromium and silica at a temperature in the range of from about 95° C. to about 400° C. with a gas flowing through the bed at a weight hourly space velocity of from about 1.9 to about 240 per hour.

20 Claims, No Drawings

(56) References Cited

U.S. PATENT DOCUMENTS

| | | |
|---|---|---|
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester et al. |
| 4,501,885 A | 2/1985 | Sherk et al. |
| 4,547,557 A | 10/1985 | McDaniel |
| 4,559,394 A | 12/1985 | McDaniel |
| 4,588,790 A | 5/1986 | Jenkins, III et al. |
| 4,832,022 A | 5/1989 | Tjulkov et al. |
| 4,981,831 A | 1/1991 | Knudsen et al. |
| 5,115,053 A | 5/1992 | Knudsen et al. |
| 5,183,792 A | 2/1993 | Wang et al. |
| 5,231,066 A | 7/1993 | Rekers et al. |
| 5,284,926 A | 2/1994 | Benham et al. |
| 5,352,749 A | 10/1994 | DeChellis et al. |
| 5,426,082 A | 6/1995 | Marsden |
| 5,436,304 A | 7/1995 | Griffin et al. |
| 5,455,314 A | 10/1995 | Burns et al. |
| 5,478,898 A | 12/1995 | Standaert |
| 5,565,175 A | 10/1996 | Hottovy et al. |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden et al. |
| 5,965,675 A | 10/1999 | Kellum et al. |
| 6,200,920 B1 | 3/2001 | Debras et al. |
| 6,239,235 B1 | 5/2001 | Hottovy et al. |
| 6,262,191 B1 | 7/2001 | Hottovy et al. |
| 6,423,663 B2 | 7/2002 | Debras |
| 6,482,901 B1 | 11/2002 | Debras |
| 6,489,428 B1 | 12/2002 | Debras et al. |
| 6,624,324 B2 | 9/2003 | Iwakura et al. |
| 6,657,023 B2 | 12/2003 | Bergmeister et al. |
| 6,707,498 B1 | 3/2004 | Toma et al. |
| 6,833,415 B2 | 12/2004 | Kendrick et al. |
| 6,855,781 B2 | 2/2005 | Bergmeister et al. |
| 7,088,394 B2 | 8/2006 | Rossi et al. |
| 7,262,259 B2 | 8/2007 | Katzen et al. |
| 7,375,169 B1 | 5/2008 | Smith et al. |
| 7,390,395 B2 | 6/2008 | Elomari |
| 7,700,516 B2 | 4/2010 | McDaniel et al. |
| 7,803,736 B2 | 9/2010 | Rohde et al. |
| 7,981,832 B2 | 7/2011 | McDaniel et al. |
| 8,183,173 B2 | 5/2012 | McDaniel et al. |
| 8,372,771 B2 | 2/2013 | Benham et al. |
| 9,023,967 B2 | 5/2015 | Yu et al. |
| 9,096,699 B2 | 8/2015 | McDaniel et al. |
| 9,587,048 B2 | 3/2017 | Praetorius et al. |
| 9,598,513 B2 | 3/2017 | Yu et al. |
| 2003/0007083 A1 | 1/2003 | Rossi et al. |
| 2004/0026324 A1 | 2/2004 | Luca |
| 2005/0153830 A1 | 7/2005 | Jensen et al. |
| 2005/0192177 A1 | 9/2005 | Roger et al. |
| 2005/0272886 A1 | 12/2005 | Cann et al. |
| 2007/0034549 A1 | 2/2007 | Elomari |
| 2008/0038161 A1 | 2/2008 | Marti et al. |
| 2013/0144017 A1 | 6/2013 | McDaniel et al. |
| 2014/0275457 A1 | 9/2014 | McDaniel et al. |
| 2014/0295178 A1 | 10/2014 | Watanabe et al. |
| 2015/0065667 A1 | 3/2015 | Cheng et al. |
| 2015/0203614 A1 | 7/2015 | Yu et al. |
| 2017/0015764 A1 | 1/2017 | Praetorius et al. |
| 2017/0037158 A1 | 2/2017 | Yu et al. |
| 2017/0080406 A1 | 3/2017 | Praetorius et al. |
| 2017/0145124 A1 | 5/2017 | Yu et al. |

FOREIGN PATENT DOCUMENTS

| | | |
|---|---|---|
| EP | 0088989 A2 | 9/1983 |
| EP | 0314385 A2 | 5/1989 |
| EP | 0337365 A2 | 10/1989 |
| EP | 0339571 A1 | 11/1989 |
| EP | 0439294 A1 | 7/1991 |
| EP | 0455444 A1 | 11/1991 |
| EP | 0589643 A1 | 3/1994 |
| EP | 0882743 B1 | 12/1998 |
| EP | 0882744 A1 | 12/1998 |
| EP | 1845110 A1 | 10/2007 |
| EP | 2172490 A1 | 4/2010 |
| EP | 2447290 A1 | 5/2012 |
| EP | 2606962 A1 | 6/2013 |
| GB | 1197069 | 7/1970 |
| GB | 1369485 | 10/1974 |
| GB | 1405721 | 9/1975 |
| GB | 1415649 | 11/1975 |
| GB | 1447605 | 8/1976 |
| GB | 1575419 | 9/1980 |
| JP | 2011117006 | 6/2011 |
| KR | 1020070015410 | 2/2007 |
| WO | 9311173 A1 | 6/1993 |
| WO | 2002/02652 A2 | 1/2002 |
| WO | 03033550 A1 | 4/2003 |
| WO | 2004/052948 A1 | 6/2004 |
| WO | 2005103100 A1 | 11/2005 |
| WO | 2009042149 A2 | 4/2009 |
| WO | 2009042149 A3 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2013082346 A3 | 6/2013 |

OTHER PUBLICATIONS

Filing receipt and specification for patent application entitled "Methods of Preparing a Catalyst," by Max McDaniel, et al., filed Nov. 17, 2017 as U.S. Appl. No. 15/816,145.

Notice of Allowance dated Dec. 19, 2017 (12 pages), U.S. Appl. No. 15/281,538, filed on Sep. 30, 2017.

Foreign communication from a related application—International Search Report and Written Opinion, PCT/US2017/067485, dated Mar. 23, 2018, 11 pages.

Filing receipt and specification for patent application entiteld "Methods of Preparing a Catalyst," by Max McDaniel, et al., filed Apr. 16, 2018 as U.S. Appl. No. 15/953,927.

Filing receipt and specification for patent application entiteld "Methods of Preparing a Catalyst," by Max McDaniel, et al., filed Apr. 16, 2018 as U.S. Appl. No. 15/953,930.

Office Action (Final) dated Apr. 26, 2018 (35 pages), U.S. Appl. No. 15/298,540, filed Oct. 20, 2016.

Foreign communication from a related application—Korean Office Action, PCT/US2012/064986, dated May 18, 2018, with translation, 16 pages.

McDaniel, M. P., et al., Activation of Phillips Cr/silica catalysts IV. Mobility of Cr(VI), Journal of Catalysis, 2007, pp. 281-295, vol. 252, Academic Press, Inc.

McDaniel, M. P., et al., The State of Cr(VI) on th ePhillips Polymerization Catalyst, Journal of Catalysis, 1982, pp. 29-36, vol. 76, Academic Press, Inc.

McDaniel, M. P., et al., Activation of Phillips Cr/silica catalysts IV. Mobility of Cr(VI), Journal of Catalysis, 1982, pp. 37-47, vol. 76, Academic Press, Inc.

Filing receipt and specification for provisional application entitled "Methods of Preparing a Catalyst," by Max McDaniel, et al., filed Dec. 29, 2016 as U.S. Appl. No. 62/440,188.

Receipt and specification for patent application entitled "Methods of Preparing a Catalyst," by Max McDaniel, et al., filed Dec. 19, 2017 as U.S. Appl. No. 15/847,129.

Iler, Ralph K., "The Chemistry of Silica: Solubility, Polymerization, Colloid and Surface Properties and Biochemistry of Silica," 1979, 1 page, Wiley.

Office Action dated Sep. 13, 2017 (35 pages), U.S. Appl. No. 15/281,538, filed Sep. 30, 2016.

Notice of Allowance dated Aug. 28, 2017 (24 pages), U.S. Appl. No. 15/281,514, filed Sep. 30, 2016.

(56) References Cited

OTHER PUBLICATIONS

Office Action dated Nov. 8, 2017 (36 pages), U.S. Appl. No. 15/298,540, filed Oct. 20, 2016.
Notice of Allowance dated Nov. 15, 2017 (37 pages), U.S. Appl. No. 15/425,646, filed Feb. 6, 2017.
Niemanstverdriet, J.W., "Spectroscopy in Catalysis: An Introduction," Jul. 11, 2008, 3rd Edition, pp. 251-295, Section 9.5, Wiley-VCH.
Foreign communication from a counterpart application—Invitation to Pay Additional Fees and Partial Search Report, PCT/US2017/053468, dated Feb. 9, 2018, 13 pages.
Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.
Conway, Steven J., et al., "Chromia/silica-titania cogel catalysts for ethene polymerisation," J. Chem. Soc., Faraday Trans., 1989, pp. 71-78, vol. 85, No. 1.
Conway, Steven J., et al., "Chromia/silica-titania cogel catalysts for ethene polymerisation," J. Chem. Soc., Faraday Trans., 1989, pp. 79-90, vol. 85, No. 1.
Conway, Steven J., et al., "Chromia/silica-titania cogel catalysts for ethene polymerisation," J. Chem. Soc., Faraday Trans., 1989, pp. 1841-1851, vol. 85, No. 7.
Ellison, Alan, et al., "Characterisation of cr/silica catalysts," J. Chem. Soc. Faraday Trans., 1993, pp. 4393-4395, vol. 89, No. 24.
Ellison, Alan, et al., "Characterisation of modified cr-silica catalysts," Journal of Molecular Catalysis, 1994, pp. 81-86, vol. 90, Elsevier Science B.V.
Foreign communication from a related counterpart application—International Search Report, PCT/US2016/029327, dated Aug. 24, 2016, 4 pages.
Foreign communication from a related counterpart application—International Search Report and Written Opinion, PCT/US2008/011068, dated Mar. 23, 2009, 18 pages.
Foreign communication from a related counterpart application—International Preliminary Report on Patentability, PCT/US2008/011068, dated Mar. 30, 2010, 11 pages.
Foreign communication from a related counterpart application—Partial Search Report, Annex to Form PCT/ISA/206, PCT/US2012/067175, dated Apr. 12, 2013, 4 pages.
Foreign communication from a related counterpart application—International Search Report and Written Opinion, PCT/US2012/067175, dated Jun. 18, 2013, 23 pages.
Foreign communication from a related counterpart application—International Preliminary Report on Patentability, PCT/US2012/067175, dated Jun. 3, 2014, 16 pages.
Foreign communication from a related counterpart application—International Search Report and Written Opinion, PCT/US2012/064986, dated Jan. 25, 2013, 8 pages.
Foreign communication from a related counterpart application—International Preliminary Report on Patentability, PCT/US2012/064986, dated Jun. 3, 2014, 5 pages.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.
McDaniel, M. P., et al., "The activation of the phillips polymerization catalyst," Journal of Catalysis, 1983, pp. 118-126, vol. 82, Academic Press, Inc.
Product Information, "LUDOX® SM-AS Colloidal Silica," 2005, W. R. Grace & Co.-Conn., 2 pages.
Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.
Pullukat, Thomas J., et al., "Titanium modified chromium catalysts for ethylene polymerization," Symposium on Transition Metal Catalysts Polymerization, Michigan Molecular Institute, Aug. 1981, pp. 697-712.
Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.
Yu, Youlu, et al., "SEC-MALS method for the determination of long-chain branching and long-chain branching distribution in polyethylene," Polymer, 2005, pp. 5165-5182, vol. 46, Elsevier Ltd.
Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.
Filing receipt and specification for patent application entitled "Methods of Preparing a Catalyst," by Max P. McDaniel, et al., filed Sep. 30, 2016 as U.S. Appl. No. 15/281,538.
Foreign communication from a related counterpart application—International Search Report & Written Opinion, PCT/US2016/051902, dated Feb. 13, 2017, 14 pages.
Notice of Allowance dated Jul. 24, 2017 (20 pages), U.S. Appl. No. 15/281,514, filed Sep. 30, 2016.
Office Action (Restriction Requirement) dated Aug. 14, 2017 (7 pages), U.S. Appl. No. 15/298,540, filed Oct. 20, 2016.
Office Action (Restriction Requirement) dated Aug. 11, 2017 (7 pages), U.S. Appl. No. 15/425,646, filed Feb. 6, 2017.
Office Action dated Apr. 4, 2018 (74 pages), U.S. Appl. No. 14/858,512, filed Sep. 18, 2015.
Foreign communication from a related application—Korean Office Action, 10-2014-7015433, dated May 18, 2018, with translation, 16 pages.
Foreign communication from a related counterpart application—International Search Report and Written Opinion, PCT/US2018/028058, dated Jul. 24, 2018, 15 pages.

METHODS OF PREPARING A CATALYST

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Polymerization catalysts are utilized widely however, methods of producing these catalysts may suffer from a variety of drawbacks. Enhancements in catalyst performance through improvements in the preparation methods for polymerization catalysts can improve both the costs associated with catalyst production and process economics. Thus, there is an ongoing need to develop new methods of preparing polymerization catalysts.

SUMMARY

Disclosed herein is a method comprising calcining a catalyst precursor comprising chromium and a silica support material at a temperature in the range of from about 95° C. to about 400° C. in a bed fluidized by a gas flowing at a volumetric flow rate from about 2.5 to about 30 times the settled volume of the bed per minute to form a calcined catalyst precursor.

Also disclosed herein is a method comprising calcining a catalyst precursor comprising chromium and silica at a temperature in the range of from about 95° C. to about 400° C. with a gas flowing through the bed at a gas hourly space velocity of from about 15 to about 200 per hour.

Also disclosed herein is a method comprising calcining a catalyst precursor comprising chromium and silica at a temperature in the range of from about 95° C. to about 400° C. with a gas flowing through the bed at a weight hourly space velocity of from about 1.9 to about 240 per hour.

DETAILED DESCRIPTION

Disclosed herein are methods for the preparation of a catalyst, alternatively a polymerization catalyst. In an aspect, polymerization catalysts produced as disclosed herein result in a high melt index (MI) potential and are herein designated high MI catalysts (HMCs).

In an aspect, an HMC comprises a silica-support. A silica-support suitable for use in the present disclosure may have a surface area and pore volume effective to provide for the production of an active catalyst (e.g., an HMC). In an aspect, the silica-support possesses a surface area in the range of from about 100 m$^2$/gram to about 1000 m$^2$/gram, alternatively from about 250 m$^2$/gram to about 700 m$^2$/gram, alternatively from about 250 m$^2$/gram to about 600 m$^2$/gram, or alternatively greater than about 100 m$^2$/gram. The silica-support may be further characterized by a pore volume of greater than about 1.0 cm$^3$/gram, or alternatively greater than about 1.5 cm$^3$/gram. In an aspect, the silica-support is characterized by a pore volume ranging from about 0.1 cm$^3$/gram to about 4.0 cm$^3$/gram. The silica-support may be further characterized by an average particle size of from about 5 microns to about 500 microns, alternatively about 25 microns to about 300 microns, or alternatively about 40 microns to about 150 microns. Generally, the average pore size of the silica-support ranges from about 10 Angstroms to about 1000 Angstroms. In one aspect, the average pore size of the silica-support is in the range of from about 50 Angstroms to about 500 Angstroms, while in yet another aspect the average pore size ranges from about 75 Angstroms to about 350 Angstroms.

The silica-support may contain greater than about 50 percent (%) silica, alternatively greater than about 80% silica, or alternatively greater than about 95% silica by weight of the silica-support. The silica-support may be prepared using any suitable method, for example the silica-support may be prepared synthetically by hydrolyzing tetrachlorosilane (SiCl$_4$) with water or by contacting sodium silicate with a mineral acid. An example of a silica-support suitable for use in this disclosure includes without limitation ES70 which is a silica-support material with a surface area of 300 m$^2$/g, and a pore volume of 1.6 cc/g that is commercially available from PQ Corporation. The silica-support may include additional components that do not adversely affect the HMC, such as zirconia, alumina, titania, thoria, magnesia, fluoride, sulfate, phosphate, or mixtures thereof.

The silica-support may be present in the HMC in an amount of from about 50 weight percent (wt. %) to about 99.9 wt. %, alternatively from about 80 wt. % to about 99.9 wt. %. or alternatively from about 90 wt. % to about 99.9 wt. %. Herein the percentage of silica-support refers to the final weight percent of silica-support associated with the catalyst by total weight of the catalyst after all processing steps (e.g., after final activation via calcination).

In an aspect, an HMC comprises titanium. The source of the titanium may be a titanium-containing compound such as a titanium alkoxide. The titanium alkoxide may comprise equal to or less than twenty-four carbon atoms. Nonlimiting examples of titanium alkoxides suitable for use in the present disclosure include titanium alkoxides comprising alkyl chains. In an aspect, the titanium alkoxide comprises titanium n-propoxide (i.e., Ti(OnPr)$_4$), titanium n-butoxide (i.e., Ti(OnBu)$_4$), titanium isopropoxide (i.e., Ti(OiPr)$_4$), or combinations thereof.

Other titanium-containing compounds suitable for use in the present disclosure may be any compound able to release a tetravalent titanium species, a trivalent titanium species or a titanium species that can readily convert into tetravalent titanium in solution. In an aspect, the titanium-containing compound comprises trivalent titanium, tetravalent titanium, titania, or combinations thereof. For example, the titanium-containing compound may comprise tetravalent titanium such as TiCl$_4$, TiOSO$_4$, TiBr$_4$, TiOCl$_2$, TiOBr$_2$, TiO$_2$, TiO (oxalate)$_2$ or combinations thereof. Alternatively, the titanium-containing compound may comprise trivalent titanium such as Ti$_2$(SO$_4$)$_3$, Ti(OAc)$_3$, Ti(oxalate)$_3$, Ti(NO$_3$)$_3$, or combinations thereof.

The amount of titanium present in the HMC may range from about 0.1 wt. % to about 10.0 wt. % titanium, alternatively from about 0.5 wt. % to about 5 wt. % titanium, alternatively from about 1 wt. % to about 4 wt. %, or alternatively from about 2 wt. % to about 4 wt. %. In another aspect, the amount of titanium may range from about 1 wt. % to about 5 wt. %. Herein, the percentage titanium refers to the final weight percent titanium associated with the catalyst by total weight of the catalyst after all processing steps (e.g., after final activation via calcination).

In an aspect, an HMC comprises chromium. The source of the chromium may be any chromium-containing compound that is substantially soluble in methanol or other alcohols. Herein, "substantially soluble" refers to a solubility of at least 0.1 grams/liter. In an aspect, the source of the chromium may be any chromium-containing compound that is substantially soluble in water; alternatively, the source of the chromium may be any chromium-containing compound that is substantially soluble in hydrocarbon solvents. The chromium-containing compound may be one or more compounds comprising chromium in the hexavalent oxidation state [referred hereinafter as chromium(VI)] or comprising a material suitable for conversion to chromium(VI). The chromium-containing compound may be a chromium(II) compound, a chromium(III) compound, or combinations thereof.

Suitable chromium(III) compounds include, but are not limited to, chromium carboxylates, chromium naphthenates, chromium halides, chromium pyrrolides, chromium benzoates, chromium dionates, chromium nitrates, chromium sulfates, or combinations thereof specific chromium(III) compounds include, but are not limited to, chromium(III) isooctanoate, chromium(III) 2,2,6,6-tetramethylheptanedionate, chromium(III) naphthenate, chromium(III) nitrate nonahydrate, chromium(III) chloride, chromium(III) tris(2-ethylhexanoate), chromic fluoride, chromium(III) oxy-2-ethylhexanoate, chromium(III) dichloroethylhexanoate, chromium(III) acetylacetonate, chromium(III) acetate, chromium(III) butyrate, chromium(III) neopentanoate, chromium(III) laurate, chromium(III) sulfate, chromium(III) oxalate, chromium(III) benzoate, chromium(III) pyrrolide(s), chromium(III) perchlorate, chromium(III) chlorate, or combinations thereof. Suitable chromium(II) compounds include, but are not limited to, chromous fluoride, chromous chloride, chromous bromide, chromous iodide, chromium(II) biscyclopentadienyl, chromium(II) bis(2-ethylhexanoate), chromium(II) acetate, chromium(II) butyrate, chromium(II) neopentanoate, chromium(II) laurate, chromium(II) stearate, chromium(II) oxalate, chromium(II) benzoate, chromium(II) pyrrolide(s), chromous sulfate, or combinations thereof.

Examples of other suitable chromium-containing compounds include without limitation tertiary butyl chromate, tertiary butyl chromate in hydrocarbon liquid, chromium trioxide, chromium trioxide in water, chromium acetate, basic chromium acetate, chromium acetate in water, silyl chromate, chromium nitrate in alcohol, zerovalent organochromium compounds such as pi bonded chromium complexes; for example, diarene chromium, dibenzene chromium and dicumene chromium, or combinations thereof pi bonded chromium complexes are described in U.S. Pat. No. 3,976,632, which is incorporated by reference herein in its entirety.

The amount of chromium present in the HMC may range from about 0.1 wt. % to about 10.0 wt. %, alternatively from about 0.25 wt. % to about 3 wt. %, or alternatively from about 0.5 wt. % to about 1.5 wt. %. Herein, the percentage chromium refers to the final weight percent chromium associated with the catalyst by total weight of the catalyst after all processing steps (e.g., after final activation via calcination).

In an aspect, an HMC of the type disclosed herein comprises a silica-support, chromium and titanium which are contacted to form a catalyst precursor which is subsequently calcined to form an HMC. Any contacting step disclosed herein may be carried out using any suitable methodology or device for effective contacting of the disclosed components. In an aspect such methodologies include without limitation ion exchange, incipient wetness, pore fill, aqueous impregnation, organic solvent impregnation, melt coating, or combinations thereof In some aspects, disclosed herein, a method for preparing an HMC comprises contacting at least two components of the HMC to form a mixture that is subsequently dried before contacting the additional components of the HMC. In some aspects a silica-support prior to utilization as component for HMC preparation is slurried in a solvent such as an alcohol (e.g., methanol).

In an aspect, a method of preparing an HMC comprises contacting the silica-support with a chromium-containing compound as described herein (e.g., basic chromium acetate) and a solvent. The solvent may be an alcohol (e.g., methanol), water or combinations thereof. Nonlimiting examples of methods for contacting the silica-support and chromium-containing compound include ion exchange, incipient wetness, pore fill, aqueous impregnation, organic solvent impregnation, melt coating, or combinations thereof. The resulting material is termed a chrominated support or a Cr-silica support.

In an aspect, a method of preparing an HMC further comprises subjecting the chrominated support to a thermal treatment. In an aspect, the thermal treatment comprises heating the chrominated support to a temperature near the boiling point of the solvent (e.g., methanol with a boiling point of approximately 65° C.). Alternatively, the chrominated support may be subjected to thermal treatment at a temperature of at least about 150° C., alternatively from about 150° C. to about 300° C., or alternatively from about 150° C. to about 220° C. The chrominated support may be subjected to thermal treatment for a time period of from about 5 hours to about 30 hours, alternatively from about 5 hours to about 15 hours, or alternatively from about 5 hours to about 8 hours. The resulting material is termed a thermally-treated chrominated support or a thermally-treated Cr-silica support.

In an aspect, the thermally-treated chrominated support may be slurried with a solvent as described herein and contacted with a titanium-containing compound (e.g., titanium alkoxide) to produce a titanated chromated support. For example, the titanium-containing compound may be added directly to the thermally-treated chromated support with vigorous mixing such that the titanium is efficiently dispersed throughout the slurry. Upon addition of the titanium-containing compound to the thermally-treated chrominated support the resulting mixture may be stirred at ambient temperature for a length of time ranging from about 5 minutes to about 30 hours, alternatively from about 15 minutes to about 12 hours, or alternatively from about 30 minutes to about 5 hours. The resulting material is termed a titanated chromated support or a Ti/Cr-silica support.

In an aspect, a method of preparing an HMC further comprises drying the titanated chromated support. Drying of the titanated chromated support may proceed at a temperature of less than about 95° C., alternatively at a temperature of from about 60° C. to about 120° C., alternatively at a temperature of from about 60° C. to about 95° C., or alternatively at a temperature of from about 100° C. to about 120° C. for a time period of from about 30 minutes to about 24 hours, or alternatively from about 1 hour to about 12 hours, or alternatively from about 2 hours to about 8 hours. The resulting material is termed catalyst precursor-1.

In an alternative aspect, a method of preparing an HMC comprises concurrently contacting the silica-support with a chromium-containing compound, a titanium-containing compound, and a solvent. The chromium-containing compound, the titanium-containing compound, the silica-support and the solvent may all be of the type previously described herein. The resulting material is termed a titanated chrominated support or a Ti/Cr-silica support.

A method of preparing an HMC further comprises drying the titanated chrominated support. Drying of the titanated chrominated support may proceed at a temperature of less than about 95° C., or alternatively at a temperature of less than about 120° C. The resulting material is termed catalyst precursor-2.

In yet another aspect, a method of preparing an HMC comprises contacting the silica support with a titanium-containing compound and a solvent. The titanium-containing compound and the solvent may be of the type previously described herein. The resulting material is termed a titanated support or a Ti-silica support.

In an aspect, the titanated support may be dried. Drying of the titanated support may proceed at a temperature of less than about 95° C. alternatively at a temperature of from about 60° C. to about 120° C., alternatively at a temperature of from about 60° C. to about 95° C., or alternatively at a temperature of from about 100° C. to about 120° C. for a time period of from about 30 minutes to about 24 hours, or alternatively from about 1 hour to about 12 hours, or alternatively from about 2 hours to about 8 hours. The resulting material is termed a dried titanated support or dried Ti-silica support.

In an aspect, the dried titanated support may be contacted with a chromium-containing compound and a solvent. The chromium-containing compound and the solvent may be of the type previously described herein. The resulting material is termed a titanated chrominated support or a Ti/Cr-silica support.

In an aspect, a method of preparing an HMC optionally comprises drying of a chrominated silica support, optionally a titanated chrominated silica support. Drying of the chrominated support may proceed at a temperature of less than about 95° C., alternatively at a temperature of from about 60° C. to about 120° C., alternatively at a temperature of from about 60° C. to about 95° C. or alternatively at a temperature of from about 100° C. to about 120° C. for a time period of from about 30 minutes to about 24 hours, or alternatively from about 1 hour to about 12 hours, or alternatively from about 2 hours to about 8 hours. The resulting material is termed a catalyst precursor.

In an aspect the catalyst precursor may be commercially available. The remainder of this disclosure will refer to the materials disclosed previously herein collectively as a catalyst precursor.

In a still further aspect, a catalyst precursor of the type disclosed herein (e.g., a commercially available precatalyst or a dried precatalyst) may be heat treated (e.g., calcined) to form an HMC. In an aspect, heat treatment of the catalyst precursor is carried out by calcining the catalyst precursor in a batch size of greater than 100 pounds. In yet another aspect, heat treatment of the catalyst precursor is carried out by calcining the catalyst precursor in a continuous calcination at a rate of greater than 5 pounds per hour. In an aspect, heat treatment of the catalyst precursor is carried out by calcining the catalyst precursor at a temperature greater than about 95° C., alternatively at a temperature greater than about 120° C., alternatively at a temperature in the range of from about 200° C. to about 500° C., alternatively from about 250° C. to about 400° C. or alternatively from about 300° C. to about 400° C. in a bed fluidized by gas flowing at a volumetric flow rate of from about 2.5 to about 30 times the settled volume of the bed per minute, alternatively from about 2.5 to about 20 times the settled volume of the bed per minute, or alternatively from about 2.5 to about 10 times the settled volume of the bed per minute. In an aspect, heat treatment of the catalyst precursor is carried out by calcining the catalyst precursor at a temperature greater than about 95° C., alternatively at a temperature greater than about 120° C., alternatively at a temperature in the range of from about 200° C. to about 500° C., alternatively from about 250° C. to about 400° C. or alternatively from about 300° C. to about 400° C. with a gas flowing through the bed at a gas hourly space velocity (GHSV, gas flow rate divided by reactor volume) of from about 15 to about 200 per hour, alternatively from about 16 to about 125 per hour, or alternatively from about 17 to about 60 per hour.

In an aspect, heat treatment of the catalyst precursor is carried out by calcining the catalyst precursor at a temperature greater than about 95° C., alternatively at a temperature greater than about 120° C., alternatively at a temperature in the range of from about 200° C. to about 500° C., alternatively from about 250° C. to about 400° C. or alternatively from about 300° C. to about 400° C. with a gas flowing through the bed at a weight hourly space velocity (WHSV, mass flow of gas divided by mass of catalyst) from about 1.9 to about 240 per hour, alternatively from about 2.0 to about 120 per hour or alternatively from about 2.1 to about 80 per hour.

In an aspect, the fluidizing gas optionally comprises an oxidizing atmosphere. Suitable oxidizing gases include air, oxygen, a mixture of air and an inert gas, a mixture of oxygen and an inert gas, or combinations thereof.

In an aspect, the fluidizing gas optionally comprises an inert atmosphere. An inert gas suitable for use in the present disclosure comprises nitrogen, neon, argon, helium, carbon dioxide and combinations thereof. Herein a fluidized bed is not limited to a particular reactor and instead refers to the physical phenomenon occurring when a quantity of a solid particulate substance such as the precursor catalyst (usually present in a holding vessel) is placed under appropriate conditions to cause a solid/fluid mixture to behave as a fluid. This is usually achieved by the introduction of pressurized fluid through the particulate medium. This results in the medium then having many properties and characteristics of normal fluids, such as the ability to free-flow under gravity, or to be pumped using fluid type technologies. A fluidized bed volume is equated to the volume of the vessel containing the precursor catalyst while a settled volume of the bed refers to the volume of precursor catalyst present in the vessel in the absence of flow of the fluidizing inert gas. The heat treatment may be carried out for a period of time ranging from about 30 minutes to about 8 hours, alternatively from about 1 hour to about 4 hours, or alternatively from about 1 hour to about 2 hours. The resultant calcined catalyst precursor is designated as the HMC.

In an aspect, the HMC may be further heat treated (i.e., calcined) to form an activated HMC. Heat treatment of the HMC may be carried out using any suitable method, e.g., fluidization. Without wishing to be limited by theory, heat treatment of the HMC may result in an increase in the amount of hexavalent chromium present in the catalyst. In an aspect, heat treatment of the HMC is carried out in any suitable atmosphere, such as air, oxygen, inert gases (e.g., Ar), or carbon monoxide by heating to a temperature of from about 400° C. to about 1000° C., alternatively from about 450° C. to about 900° C., alternatively from about 500° C. to about 800° C. or alternatively from about 500° C. to about 700° C. Heat treatment may be carried out for a period of time ranging from about 30 minutes to about 24 hours, alternatively from about 1 hour to about 12 hours, or alternatively from about 4 hours to about 12 hours.

In an aspect, one or more of the steps described previously herein for the preparation of an HMC may be carried out in a reactor or reactor system. In an alternative aspect, one or more of the steps described previously herein for the preparation of an HMC may be carried out outside of a reactor or reactor system. In such aspects, one or more preparation parameters (e.g., heat treatment of the dried catalyst precursor) may be adjusted to facilitate formation of the HMC.

The catalysts of the present disclosure (i.e., HMCs) are suitable for use in any olefin polymerization method, using various types of polymerization reactors. In an aspect, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, continuous, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an aspect, any arrangement and/or any combination of reactors may be employed to produce the polymer of the present disclosure.

According to one aspect, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another aspect, a high-pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually at about 200 psig (1.4 MPa)-500 psig (3.45 MPa). High pressure polymerization in tubular or autoclave reactors is generally run at about 20,000 psig (138 MPa); to 75,000 psig (518 MPa). Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the HMCs prepared as described herein. Polymer resins produced as disclosed herein may be formed into articles of manufacture or end use articles using any suitable methodology such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth.

According to a further aspect, an alpha olefin monomer may be contacted with an HMC under conditions suitable for formation of a polymer and the polymer may be recovered. In an aspect, the monomer comprises ethylene and the polymer comprises polyethylene. In an aspect, the polymer recovered as described herein may be characterized by a melt index (MI) value that is from about 1.5 to about 15 times, alternatively from about 2 to about 15 times, greater than an otherwise similar polymer produced in the presence of a catalyst dried at temperatures in excess of 95° C. and calcined in the presence of from about 2.5 to about 30 volumes of inert gas per settled bed volume per minute. In another aspect, the polymer recovered as described herein may be characterized by an I10 value that is from about 1.5 to about 15 times, alternatively from about 2 to about 15 times, greater than an otherwise similar polymer produced in the presence of a catalyst dried at temperatures in excess of 95° C. and calcined in the presence of from about 2.5 to about 30 volumes of inert gas per settled bed volume per minute. In another aspect, the polymer recovered as described herein may be characterized by a high load melt index (HLMI) value that is from about 1.5 to about 15 times, alternatively from about 2 to about 15 times, greater than an otherwise similar polymer produced in the presence of a catalyst dried at temperatures in excess of 95° C. and calcined in the presence of from about 2.5 to about 30 volumes of inert gas per settled bed volume per minute. The MI refers to the amount of a polymer which can be forced through an extrusion rheometer orifice of 0.0825 inch diameter when subjected to a force of 2.16 kilograms in ten minutes at 190° C. while the I10 refers to the amount of a polymer which can be forced through an extrusion rheometer orifice of 0.0825 inch diameter when subjected to a force of 10 kilograms in ten minutes at 190° C. and the high load melt index (HLMI) refers to the amount of a polymer which can be forced through an extrusion rheometer orifice of 0.0825 inch diameter when subjected to a force of 21.6 kilograms in ten minutes at 190° C., all as determined in accordance with ASTM D 1238.

As described in U.S. Pat. No. 8,372,771 (Benham, et al), a catalyst activator may be useful for increasing the amount of hexavalent chromium ($Cr^{6+}$) on a chromium oxide catalyst. Benham, et al, describe a variety of activator variables that may be manipulated in order to achieve the desired catalytic properties. One such variable is Space Velocity (SV). Benham, et al, teach that the SV at low activation temperatures (below 600° C.) is less important than the SV at higher activation temperatures.

In addition, EP 2447290 teaches the use of a low SV during the early stages of thermal treatment of the catalyst (up to about 200° C. or higher). This low SV is said to result in mitigation of catalyst fragmentation issues. One aspect of the present invention comprises increasing the SV during the early stages of the activation. Catalysts activated according to the present invention (HMCs) produce polymers of higher MI.

EXAMPLES

The subject matter of the present disclosure having been generally described, the following examples are given as particular embodiments of the disclosure and to demonstrate the practice and advantages thereof. It is understood that the examples are given by way of illustration and are not intended to limit the specification or the claims to follow in any manner.

Example 1

Example Catalysts A and B were prepared by activating ES370X, a chromium on silica catalyst obtained from PQ Corporation, to a final hold temperature of 650° C. in a laboratory catalyst activator. Example catalyst A, an HMC of the type disclosed herein, was prepared by calcining approximately 50 mL of ES370X in dry air (1.2-1.4 scfh, approximately 11 to 23 bed changes per minute) up to a temperature of 400° C. in dry air, then activated by calcining in dry air (approximately 1.2 scfh) at 4° C./min to 650° C. for 3 hours to form an active catalyst. Control Example Catalyst B was prepared by calcining approximately 200 mL of ES370X in dry air (approximately 0.4 scfh, approximately 0.9 to 1.9 bed changes per minute) up to a temperature of 400° C. in dry air, then activated by calcining in dry air (approximately 0.4 scfh) at 4° C./min to 650° C. for 3 hours to form an active catalyst.

The catalysts were then used to prepare polymers. Polymerization runs were made in a 2.65 L stainless steel reactor equipped with a marine stirrer rotating at 500 rpm. The reactor was surrounded by a stainless steel jacket through which was circulated a stream of hot water, which permitted precise temperature control of the reactor to within half a degree centigrade, with the help of electronic control instrumentation. A small amount of the catalyst (0.05 to 0.10 g) was first charged to the reactor under dry nitrogen. Next, 1.2 L of liquid isobutane was added and the reactor heated to the 105° C. set temperature. Ethylene was then added to the reactor, which was maintained at 550 psig throughout the course of the experiment. The reactor was run to a productivity of approximately 2000 g•polyethylene/g•catalyst as determined by the flow controllers of the reactor instrumentation based on ethylene flow to the reactor. After the allotted productivity, the ethylene flow to the reactor was stopped and the reactor slowly depressurized and opened to recover the granular polymer powder. Dry powder was then removed and weighed. Productivity was determined from the dry powder weight and calculated as mass of polymer recovered divided by mass of catalyst used. The HLMI and I10 of the polymers produced from these catalysts presented in Table 1 demonstrate the loss of I10 and HLMI potential when the catalyst is calcined at lower fluidization velocity.

TABLE 1

| Catalyst | Prod. | HLMI | I10 |
|---|---|---|---|
| A | 1850 g/g | 4.31 | 0.695 |
| A | 2310 g/g | 4.25 | 0.745 |
| B | 1790 g/g | 2.96 | 0.330 |

Example 2

Example Catalysts C, D, and E were prepared as follows: Fifteen pounds of silica was charged to a reactor, followed by chromium acetate dissolved in methanol. The methanol was removed by distillation, then the silica was dried at 165 C. After cooling, the chrominated silica was slurried in heptane, to which Ti(OnPr)$_4$ (enough to give 3.0 wt % Ti) was added. The titanated-chrominated silica was heated to remove the heptane and other volatiles under a very low flow of nitrogen (~0.03 bed changes per minute). Control Example Catalyst C was dried at a final temperature of 160° C. (under a nitrogen flow of approximately 0.03 bed changes per minute), but a sample was collected when the drying temperature reached 115° C. (Example Catalyst D an HMC of the type disclosed herein). Example Catalyst E, an HMC of the type disclosed herein, was dried at a final temperature of 120° C. Approximately 50 mL of Example Catalyst C was then activated by calcination in dry air (1.2-1.6 scfh) at 4° C./min to 650° C. for 3 hours to form an active catalyst. Approximately 50 mL of each of Example Catalysts D and E were further treated by calcination at 160° C. in dry air (1.2-1.6 scfh, 15-20 bed changes per minute), then activated by calcination in dry air (1.2-1.6 scfh) at 4° C./min to 650° C. for 3 hours to form an active catalyst.

Polymerization runs were made in a 2.65 L stainless steel reactor equipped with a marine stirrer rotating at 500 rpm. The reactor was surrounded by a stainless steel jacket through which was circulated a stream of hot water, which permitted precise temperature control of the reactor to within half a degree centigrade, with the help of electronic control instrumentation. A small amount of the catalyst (0.05 to 0.10 g) was first charged to the reactor under dry nitrogen. Next, approximately 0.6 L of liquid isobutane was added, followed by 5 mL of 1-hexene and additional liquid isobutane to a total of 1.2 L and the reactor heated to the 100° C. set temperature. Ethylene was then added to the reactor, which was maintained at 550 psig throughout the course of the experiment. The reactor was run to a productivity of approximately 3000 g•polyethylene/g•catalyst as determined by the flow controllers of the reactor instrumentation based on ethylene flow to the reactor. After the allotted productivity, the ethylene flow to the reactor was stopped and the reactor slowly depressurized and opened to recover the granular polymer powder. Dry powder was then removed and weighed. Productivity was determined from the dry powder weight and calculated as mass of polymer recovered divided by mass of catalyst used. The HLMI and MI of the polymers produced from these catalysts presented in Table 2 demonstrate the loss of MI and HLMI potential when the catalyst is dried at higher temperature.

TABLE 2

| Catalyst | Prod. | HLMI | MI |
|---|---|---|---|
| D | 3260 g/g | 35.1 | 0.39 |
| D | 2710 g/g | 41.6 | 0.45 |
| D | 3180 g/g | 33.7 | 0.38 |
| D | 3110 g/g | 39.8 | 0.42 |
| C | 3310 g/g | 23.2 | 0.23 |
| C | 3320 g/g | 26.9 | 0.26 |
| C | 3110 g/g | 27.4 | 0.29 |
| E | 2840 g/g | 41.6 | 0.49 |
| E | 3350 g/g | 40.3 | 0.45 |
| E | 2950 g/g | 45.2 | 0.57 |
| E | 3250 g/g | 28.4 | 0.22 |
| E | 3020 g/g | 47.7 | 0.51 |
| E | 3030 g/g | 32.9 | 0.36 |
| E | 3060 g/g | 26.3 | 0.24 |

Example 3

HMC1 was prepared as described in Example 2 with a 3.0% titanium loading. Aliquots of this catalyst were activated under various conditions and tested in a laboratory polymerization reactor as described above. A standard lab activation with approximately 50 mL of HMC1 was then performed by calcination in dry air (1.2-1.6 scfh) at 4° C./min to 650° C. for 3 hours to form an active catalyst, this equates to an air flow of approximately 26 bed changes per minute (Example Catalyst F, an HMC of the type disclosed herein). A standard commercial-scale activation of approximately 500 pounds of HMC1 was performed with approximately 2.2 bed changes per minute nitrogen flow up to 700° F. (371° C.), and increased velocity of dry air thereafter, to a final hold temperature of 1200° F. (649° C., Control Example Catalyst G). An additional commercial-scale activation of approximately 500 pounds of HMC1 was performed using a nitrogen flow of approximately 2.9 to 4.9 bed changes per minute up to about 750° F. (399° C.), with increased velocity of dry air thereafter to a final hold temperature of 1200° F. (649° C., Example Catalyst H, an HMC of the type disclosed herein). A low-velocity lab activation of HMC1 was performed under approximately 2.0 bed changes per minute air flow up to 950° F. (510° C.), and increased velocity thereafter (Control Example Catalyst I). Finally, a lab activation of HMC1 was performed using approximately 2.65 bed changes per minute nitrogen flow up to 750° F. (399° C.), and increased velocity of dry air thereafter (Example Catalyst J, an HMC of the type disclosed herein). The polymerization results in Table 3 demonstrate the improvement in MI and HLMI potential realized by activating at higher low-temperature space velocities (SV).

TABLE 3

| Catalyst | Catalyst Description | Productivity | HLMI | MI |
|---|---|---|---|---|
| F | SV = 26/min | 2720 g/g | 50.5 | 0.53 |
| F | SV = 26/min | 3100 g/g | 33.8 | 0.37 |
| F | SV = 26/min | 2990 g/g | 33.2 | 0.38 |
| F | SV = 26/min | 3180 g/g | 32.0 | 0.30 |
| G | SV = 2.2/min | 3130 g/g | 17.1 | 0.18 |
| G | SV = 2.2/min | 3420 g/g | 19.9 | 0.18 |
| G | SV = 2.2/min | 3130 g/g | 15.7 | 0.14 |
| G | SV = 2.2/min | 3140 g/g | 18.4 | 0.17 |
| G | SV = 2.2/min | 2700 g/g | 18.3 | 0.19 |
| H | SV = 2.9/min | 3070 g/g | 25.0 | 0.23 |
| H | SV = 2.9/min | 3270 g/g | 31.1 | 0.30 |
| H | SV = 2.9/min | 2950 g/g | 27.4 | 0.27 |
| H | SV = 2.9/min | 2910 g/g | 25.5 | 0.23 |
| H | SV = 2.9/min | 2820 g/g | 26.0 | 0.21 |
| H | SV = 2.9/min | 3170 g/g | 26.8 | 0.24 |
| I | SV = 2.0/min | 3250 g/g | 11.5 | 0.10 |
| I | SV = 2.0/min | 3250 g/g | 12.2 | 0.10 |
| I | SV = 2.0/min | 3130 g/g | 11.0 | 0.07 |
| J | SV = 2.65/min | 3640 g/g | 23.1 | 0.25 |
| J | SV = 2.65/min | 3120 g/g | 28.8 | 0.32 |
| J | SV = 2.65/min | 3140 g/g | 28.3 | 0.26 |

ADDITIONAL DISCLOSURE

A first aspect which is a method comprising calcining a catalyst precursor comprising chromium and a silica support at a temperature in the range of from about 95° C. to about 400° C., in a bed fluidized by a gas flowing at a volumetric flow rate of from about 2.5 to about 30 times the settled volume of the bed per minute to form a calcined catalyst precursor.

A second aspect which is the method of the first aspect wherein the gas comprises an oxidizing atmosphere.

A third aspect which is the method of the first aspect wherein the gas comprises an inert atmosphere.

A fourth aspect which is the method of the third aspect wherein the gas comprises nitrogen, helium, argon, carbon dioxide or combinations thereof.

A fifth aspect which is the method of any of the first through fourth aspects wherein the catalyst precursor is dried at temperatures less than about 95° C. prior to the calcination step.

A sixth aspect which is the method of any of the first through fifth aspects wherein the silica support has a surface area of from about 100 m$^2$/gram to about 1000 m$^2$/gram, a pore volume in the range of from about 0.1 cm$^3$/gram to about 4.0 cm$^3$/gram and an average particle size in the range of from about 5 μm to about 500 μm.

A seventh aspect which is the method of any of the first through sixth aspects wherein the silica support comprises greater than about 50 percent silica by weight of the support.

An eighth aspect which is the method of any of the first through seventh aspects wherein the catalyst has a silica support content of from about 90 wt. % to about 99.9 wt, % based on a final weight of the catalyst.

A ninth aspect which is the method of any of the first through eighth aspects wherein the catalyst has a chromium content of from about 0.1 wt % to about 10.0 wt % based on a final weight of the catalyst.

A tenth aspect which is the method of any of the first through ninth aspects wherein the calcined catalyst precursor is further heat treated at a temperature of from about 400° C. to about 1000° C. to form an activated catalyst.

An eleventh aspect which is the method of tenth aspect wherein the activated catalyst is additionally comprises titanium.

A twelfth aspect which is the method of the eleventh aspect wherein the catalyst has a titanium content of from about 0.1 wt % to about 10.0 wt % based on a final weight of the catalyst.

A thirteenth aspect which is the method of any of the tenth through twelfth aspects further comprising contacting a monomer with the catalyst under conditions suitable for the formation of a polymer and recovering the polymer.

A fourteenth aspect which is the method of the thirteenth aspect wherein the polymer has a melt index that is from about 1.5 to about 15 times greater than an otherwise similar polymer produced in the presence of a catalyst dried at temperatures in excess of 95° C., alternatively at temperatures in excess of about 120° C. and calcined in the presence of from about 2.5 to about 30 volumes of inert gas per settled bed volume per minute.

A fifteenth aspect which is the method of any of the thirteenth through fourteenth aspects wherein the polymer has an I10 that is from about 1.5 to about 15 times greater than an otherwise similar polymer produced in the presence of a catalyst dried at temperatures in excess of 95° C. and calcined in the presence of from about 2.5 to about 30 volumes of inert gas per settled bed volume per minute.

A sixteenth aspect which is the method of any of the thirteenth through fifteenth aspects wherein the polymer has a high load melt index that is from about 2 to about 15 times greater than an otherwise similar polymer produced in the presence of a catalyst dried at temperatures in excess of 95° C. and calcined in the presence of from about 2.5 to about 30 volumes of inert gas per settled bed volume per minute.

A seventeenth aspect which is the method of any of the thirteenth through sixteenth aspects wherein the polymer has a melt index that is from about 1.5 to about 15 times greater than an otherwise similar polymer produced in the presence of a catalyst dried at temperatures in excess of 95° C. and calcined in the presence of a gas flowing through the bed at a gas hourly space velocity from about 15 to about 200 per hour.

An eighteenth aspect which is the method of any of the thirteenth through seventeenth aspects wherein the polymer has an I10 that is from about 1.5 to about 15 times greater than an otherwise similar polymer produced in the presence of a catalyst dried at temperatures in excess of 95° C., and calcined in the presence of a gas flowing through the bed at a gas hourly space velocity of from about 15 to about 200 per hour.

A nineteenth aspect which is the method of any of the thirteenth through eighteenth aspects wherein the polymer has a high load melt index that is from about 2 to about 15 times greater than an otherwise similar polymer produced in the presence of a catalyst dried at temperatures in excess of 95° C. and calcined in the presence of a gas flowing through the bed at a gas hourly space velocity of from about 15 to about 200 per hour.

A twentieth aspect which is the method of any of the thirteenth through nineteenth aspects wherein the polymer has a melt index that is from about 1.5 to about 15 times greater than an otherwise similar polymer produced in the presence of a catalyst dried at temperatures in excess of 95° C. and calcined in the presence of a gas flowing through the bed at a weight hourly space velocity from about 1.9 to about 240 per hour.

A twenty-first aspect which is the method of any of the thirteenth through twentieth aspects wherein the polymer has a melt index that is from about 1.5 to about 15 times greater than an otherwise similar polymer produced in the presence of a catalyst dried at temperatures in excess of 95° C. and calcined in the presence of a gas flowing through the bed at a weight hourly space velocity of from about 1.9 to about 240 per hour.

A twenty-second aspect which is the method of any of the thirteenth through twenty-first aspects wherein the polymer has a high load melt index that is from about 2 to about 15 times greater than an otherwise similar polymer produced in the presence of a catalyst dried at temperatures in excess of 95° C. and calcined in the presence of a gas flowing through the bed at a weight hourly space velocity of from about 1.9 to about 240 per hour.

A twenty-third aspect which is a method comprising calcining a catalyst precursor comprising chromium and silica at a temperature in the range of from about 95° C. to about 400° C., with a gas flowing through the bed at a gas hourly space velocity of from about 15 to about 200 per hour.

A twenty-fourth aspect which is a method comprising calcining a catalyst precursor comprising chromium and silica at a temperature in the range of from about 95° C. to about 400° C. with a gas flowing through the bed at a weight hourly space velocity of from about 1.9 to about 240 per hour.

A twenty-fifth aspect which is a method comprising (a) contacting a silica support material with a chromium-containing compound and a solvent to form a Cr-silica support; (b) thermally treating the Cr-silica support to form a thermally-treated Cr-silica support; (c) contacting the thermally-treated Cr-silica support with a titanium-containing compound in the presence of a solvent to form a Ti/Cr-silica support; (d) drying the Ti/Cr-silica support at temperatures less than about 95° C. to form a catalyst precursor; and (e) calcining the catalyst precursor at a temperature in the range of from about 95° C. to about 400° C. in a bed fluidized by inert gas flowing at a volumetric flow rate of from about 2.5 to about 30 times the settled volume of the bed per minute.

A twenty-sixth aspect which is method comprising (a) contacting a silica support material with a chromium-containing compound, a titanium-containing compound and a solvent to form a Ti/Cr-silica support; (b) drying the Ti/Cr-silica support at temperatures less than about 95° C. to form a catalyst precursor; and (c) calcining the catalyst precursor at a temperature in the range of from about 95° C. to about 400° C. in a bed fluidized by inert gas flowing at a volumetric flow rate of from about 2.5 to about 30 times the settled volume of the bed per minute.

A twenty-seventh aspect which is a method comprising (a) contacting a silica support material with a titanium-containing compound and a solvent to form a Ti-silica support; (b) drying the Ti-silica support to form a dried Ti-silica support wherein the drying occurs at a temperature of less than about 95° C. (c) contacting the dried Ti-silica support with a chromium-containing compound in the presence of a solvent to form a Ti/Cr-silica support; (d) drying the Ti/Cr-silica support at temperatures less than about 95° C. to form a catalyst precursor; and (e) calcining the catalyst precursor at a temperature in the range of from about 95° C. to about 400° C. in a bed fluidized by inert gas flowing at a volumetric flow rate of from about 2.5 to about 30 times the settled volume of the bed per minute.

A twenty-eighth aspect which is the method of any of the twenty-fifth through twenty-seventh aspects wherein contacting comprises ion exchange, incipient wetness, pore fill, aqueous impregnation, organic solvent impregnation, melt coating, or combinations thereof.

A twenty-ninth aspect which is the method of any of the twenty-fifth through twenty-seventh aspects wherein contacting excludes cogellation.

A thirtieth aspect which is the method of any of the twenty-fifth through twenty-seventh aspects wherein the titanium-containing compound comprises $TiCl_4$, $TiOSO_4$, $TiBr_4$, $TiOCl_2$, $TiOBr_2$, $TiO_2$, $TiO(oxalate)_2$, or combinations thereof.

A thirty-first aspect which is the method of any of the twenty-fifth through twenty-seventh aspects wherein the chromium-containing compound comprises chromium trioxide, chromium acetate, chromium nitrate, chromium sulfate, tertiary butyl chromate, a diarene chromium (0) compound, biscyclopentadienyl chromium(II), chromium (III) acetylacetonate, or combinations thereof.

A thirty-second aspect which is the method of any of the twenty-fifth through twenty-seventh aspects wherein the solvent comprises, water, methanol, or combinations thereof.

A thirty-third aspect which is the method of any of the twenty-fifth through twenty-seventh aspects wherein the inert gas comprises nitrogen, helium, argon, carbon dioxide or combinations thereof.

A thirty-fourth aspect which is the method of any of the twenty-fifth through twenty-seventh aspects wherein prior to step (a) the silica support material is slurried in a solvent.

A thirty-fifth aspect which is the method of any of the twenty-fifth through twenty-seventh aspects wherein the silica support material has a surface area of from about 100 $m^2$/gram to about 1000 $m^2$/gram, a pore volume in the range of from about 0.1 $cm^3$/gram to about 4.0 $cm^3$/gram and an average particle size in the range of from about 5 μm to about 500 μm.

A thirty-sixth aspect which is the method of any of the twenty-fifth through twenty-seventh aspects wherein the silica support material comprises greater than about 50 percent silica by weight of the support.

A thirty-seventh aspect which is the method of any of the twenty-fifth through twenty-seventh aspects wherein the catalyst has a silica support material content of from about 90 wt. % to about 99.9 wt, % based on a final weight of the catalyst.

A thirty-eighth aspect which is the method of any of the twenty-fifth through twenty-seventh aspects wherein the catalyst has a chromium content of from about 0.1 wt % to about 10.0 wt. % based on a final weight of the catalyst.

A thirty-ninth aspect which is the method of any of the twenty-fifth through twenty-seventh aspects wherein the catalyst has a titanium content of from about 0.1 wt % to about 10.0 wt % based on a final weight of the catalyst.

A fortieth aspect which is the method of any of the twenty-fifth through twenty-seventh aspects wherein the calcined catalyst precursor is further heat treated at a temperature of from about 400° C. to about 1000° C. to form an activated catalyst.

A forty-first aspect which is the method of the fortieth aspect further comprising contacting a monomer with the catalyst under conditions suitable for the formation of a polymer and recovering the polymer.

A forty-second aspect which is the method of the forty-first aspect wherein the polymer has a melt index that is polymer has an I10 that is from about 1.5 to about 15 times greater than an otherwise similar polymer produced in the presence of a catalyst dried at temperatures in excess of 95° C. and calcined in the presence from about 2.5 to about 30 volumes of inert gas per settled bed volume per minute.

While various aspects have been shown and described, modifications thereof can be made by one skilled in the art without departing from the spirit and teachings of the disclosure. The aspects described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising calcining a catalyst precursor comprising chromium and a silica support at a temperature in the range of from about 95° C. to about 400° C. in a bed fluidized by a gas flowing at a volumetric flow rate of from about 2.5 to about 30 times the settled volume of the bed per minute to form a calcined catalyst precursor.

2. The method of claim 1, wherein the gas comprises an oxidizing atmosphere.

3. The method of claim 1, wherein the gas comprises an inert atmosphere.

4. The method of claim 3, wherein the gas comprises nitrogen, helium, argon, carbon dioxide or combinations thereof.

5. The method of claim 1, wherein the catalyst precursor is dried at temperatures less than about 95° C. prior to the calcination step.

6. The method of claim 1, wherein the silica support has a surface area of from about 1.00 $m^2$/gram to about 1100 $m^2$/gram, a pore volume in the range of from about 0.1 $cm^3$/gram to about 4.0 $cm^3$/gram and an average particle size in the range of from about 5 μm to about 500 μm.

7. The method of claim 1, wherein the calcined catalyst precursor is further heat treated in the range of from about 400° C. to about 1000° C. to form an activated catalyst.

8. The method of claim 1, wherein the calcined catalyst precursor further comprises titanium.

9. The method of claim 8, further comprising contacting a monomer with the calcined catalyst precursor under conditions for the formation of a polymer and recovering the polymer.

10. The method of claim 9, wherein the catalyst precursor id dried at temperatures less than about 95° C. prior to the calcination step, and wherein the polymer has a melt index (MI), determined according to ASTM D128 as the amount of polymer which can be forced through an extrusion rheometer orifice of 0.0825 inch diameter when subjected to a force of 2.16 kilograms in ten minutes at 190° C., that is from about 1.5 to about 15 times greater than an otherwise similar polymer produced in the presence of a catalyst precursor dried at temperatures in excess of 95° C. and calcined in the presence of from about 2.5 to about 30 volumes of inert gas per settled bed volume per minute.

11. The method of claim 9, wherein the catalyst precursor is dried at temperatures less than about 95° C. prior to the calcination step, and wherein the polymer has an I10, determined according to ASTM D1238 as the amount of polymer which can be forced through an extrusion rheometer orifice of 0.0825 inch diameter when subjected to a force of 10 kilograms in ten minutes at 190° C., that is from about 1.5 to about 15 times greater than an otherwise similar polymer produced in the presence of a catalyst precursor dried at temperatures in excess of 95° C. and calcined in the presence of from about 2.5 to about 30 volumes of inert gas per settled bed volume per minute.

12. The method of claim 9, wherein the catalyst precursor is dried at temperatures less than about 95° C. prior to the calcination step, and wherein the polymer has a high load melt index, determined according to ASTM D1238 as the amount of polymer which can be forced through an extrusion rheometer orifice of 0.0825 inch diameter when subjected to a force of 21.6 kg in ten minutes at 190° C., that is from about 2 to about 15 times greater than an otherwise similar polymer produced in the presence of a catalyst precursor dried at temperatures in excess of 95° C. and calcined in the presence of from about 2.5 to about 30 volumes of inert gas per settled bed volume per minute.

13. The method of claim 9, wherein the catalyst precursor is dried at temperatures less than about 95° C. prior to the calcination step, and wherein the polymer has a melt index (MI), determined according to ASTM D1238 as the amount of polymer which can be forced through an extrusion rheometer orifice of 0.0825 inch diameter when subjected to a force of 2.16 kilograms in ten minutes at 190° C., that is from about 1.5 to about 15 times greater than an otherwise similar polymer produced in the presence of a catalyst precursor dried at temperatures in excess of 95° C. and calcined in the presence of a gas flowing through the bed at a gas hourly space velocity of from about 15 to about 200 per hour.

14. The method of claim 9, wherein the catalyst precursor is dried at temperatures less than about 95° C. prior to the calcination step, and wherein the polymer has an I10, determined according to ASTM D1238 as the amount of polymer which can be forced through an extrusion rheometer orifice of 0.0825 inch diameter when subjected to a force of 10 kilograms in ten minutes at 190° C., that is from about 1.5 to about 15 times greater than an otherwise similar polymer produced in the presence of a catalyst precursor dried at temperatures in excess of 95° C. and calcined in the presence of a gas flowing through the bed at a gas hourly space velocity of from about 15 to about 200 per hour.

15. The method of claim 9, wherein the catalyst precursor is dried at temperatures less than about 95° C. prior to the calcination step, and wherein the polymer has a high load melt index, determined according to ASTM D1238 as the amount of polymer which can be forced through an extrusion rheometer orifice of 0.0825 inch diameter when subjected to a force of 21.6 kg in ten minutes at 190° C., that is from about 2 to about 15 times greater than an otherwise similar polymer produced in the presence of a catalyst precursor dried at temperatures in excess of 95° C. and calcined in the presence of a gas flowing through the bed at a gas hourly space velocity of from about 15 to about 200 per hour.

16. The method of claim 9, wherein the catalyst precursor is dried at temperatures less than about 95° C. prior to the calcination step, and wherein the polymer has a melt index (MI), determined according to ASTM D1238 as the amount of polymer which can be forced through an extrusion rheometer orifice of 0.0825 inch diameter when subjected to a force of 2.16 kilograms in ten minutes at 190° C., that is from about 1.5 to about 15 times greater than an otherwise similar polymer produced in the presence of a catalyst precursor dried at temperatures in excess of 95° C. and calcined in the presence of a gas flowing through the bed at a weight hourly space velocity of from about 1.9 to about 240 per hour.

17. The method of claim 9, wherein the catalyst precursor is dried at temperatures less than about 95° C. prior to the calcination step, and wherein the polymer has a I10, determined according to ASTM D1238 as the amount of polymer which can be forced through an extrusion rheometer orifice of 0.0825 inch diameter when subjected to a force of 10 kilograms in ten minutes at 190° C., that is from about 1.5 to about 15 times greater than an otherwise similar polymer produced in the presence of a catalyst precursor is dried at temperatures in excess of 95° C. and calcined in the presence of a gas flowing through the bed at a weight hourly space velocity of from about 1.9 to about 240 per hour.

18. The method of claim 9, wherein the catalyst precursor is dried at temperatures less than about 95° C. prior to the calcination step, and wherein the polymer has a high load melt index, determined according to ASTM D1238 as the amount of polymer which can be forced through an extrusion rheometer orifice of 0.0825 inch diameter when subjected to a force of 21.6 kilograms in ten minutes at 190° C., that is from about 2 to about 15 times greater than an otherwise similar polymer produced in the presence of a catalyst precursor dried at temperatures in excess of 95° C. and calcined in the presence of a gas flowing through the bed at a weight hourly space velocity of from about 1.9 to about 240 per hour.

19. A method comprising calcining a catalyst precursor comprising chromium and silica at a temperature in the range of from about 95° C. to about 400° C. with a gas flowing through the bed at a gas hourly space velocity, defined as gas flow rate divided by reactor volume, of from about 15 to about 200 per hour.

20. A method comprising calcining a catalyst precursor comprising chromium and silica at a temperature in the range of from about 95° C. to about 400° C. with a gas flowing through the bed at a weight hourly space velocity, defined as mass flow of gas divided by mass of catalyst, of from about 1.9 to about 240 per hour.

* * * * *